United States Patent
Okamoto et al.

(10) Patent No.: US 6,239,559 B1
(45) Date of Patent: May 29, 2001

(54) LIGHT SOURCE USING DIELECTRIC BARRIER DISCHARGE LAMP

(75) Inventors: Masashi Okamoto, Akashi; Kenichi Hirose, Himeji, both of (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/355,348

(22) PCT Filed: Jan. 11, 1999

(86) PCT No.: PCT/JP99/00047

§ 371 Date: Aug. 6, 1999

§ 102(e) Date: Aug. 6, 1999

(87) PCT Pub. No.: WO99/35891

PCT Pub. Date: Jul. 15, 1999

(30) Foreign Application Priority Data

Jan. 9, 1998 (JP) .................................................. 10-013540

(51) Int. Cl.$^7$ ....................................................... G05F 1/00
(52) U.S. Cl. ........................ 315/307; 315/57; 315/111.21; 315/219; 315/276
(58) Field of Search .................................. 315/56, 57, 70, 315/111.01, 111.21, 209 R, 219, 276, 291, 307

(56) References Cited

U.S. PATENT DOCUMENTS 4,253,047 * 2/1981 Walker et al. ........................... 315/57

(List continued on next page.)

FOREIGN PATENT DOCUMENTS 1-243363 9/1989 (JP) .

(List continued on next page.)

OTHER PUBLICATIONS

Discharge Handbook, Elektroassociation, Jun.1989, 7$^{th}$ Edition, pp. 263–271.

Primary Examiner—Don Wong
Assistant Examiner—Thuy Vinh Tran
(74) Attorney, Agent, or Firm—Nixon Peabody LLP; David S. Safran

(57) ABSTRACT

A feed device (7), via a set-up transformer (8), applies a high voltage with an essentially periodic waveform to a dielectric barrier discharge lamp (1), and the condition $Vy/Vx \leq 1.0$ is satisfied when a point K is considered which corresponds to the instant of starting of the discharge of the voltage waveform applied to the lamp, and where Vk is the voltage at the point K which corresponds to the time of starting of the discharge of the voltage waveform applied to the lamp;

Vf is the voltage applied to the lamp upon completion of the discharge just before a discharge to which the point K belongs, the point K corresponding to the time of starting of the discharge of the voltage waveform applied to the lamp;

Vh is the voltage applied to the lamp at a point U5, this point showing the maximum of the absolute value of the voltage applied to the lamp in the time interval from the time of transition of the point K to the next change of polarity of the voltage applied to the lamp, and the point K corresponding to the time of starting of the discharge of the voltage waveform applied to the lamp;

Vb is the voltage applied to the lamp at a point U4 of the voltage waveform applied to the lamp, this point showing the minimum of the absolute value in a closed gap between the point K and the point U5 the point K corresponding to the time of starting of the discharge of the voltage waveform applied to the lamp and the point U5 showing the maximum of the absolute value of the voltage applied to the lamp;

Vx is the absolute value of the difference Vk–Vf; and

Vy is the absolute value of the difference Vh–Vb.

3 Claims, 10 Drawing Sheets

U.S. PATENT DOCUMENTS

| | | | |
|---|---|---|---|
| 4,983,881 | | 1/1991 | Eliasson et al. ..................... 313/607 |
| 5,495,149 | * | 2/1996 | Hiramatsu et al. .............. 315/209 R |
| 5,604,410 | | 2/1997 | Vollkommer et al. ............... 315/246 |
| 5,977,722 | * | 11/1999 | Yokokawa et al. .................. 315/219 |

FOREIGN PATENT DOCUMENTS

| | | |
|---|---|---|
| 6-163006 | 6/1994 | (JP) . |
| 8-31585 | 2/1996 | (JP) ................ H05B/41/24 |
| 8-146198 | 6/1996 | (JP) ................. G21K/5/00 |

* cited by examiner

LIGHT SOURCE USING DIELECTRIC BARRIER DISCHARGE LAMP

TECHNICAL FIELD

The invention relates to a light source device which comprises a so-called dielectric barrier discharge lamp. This dielectric barrier discharge lamp is a type of discharge lamp which is used as a UV light source for a photochemical reaction and in which light emitted from excimer molecules which are formed by a dielectric barrier discharge is used.

DESCRIPTION OF RELATED ART

Generic art with respect to the dielectric barrier discharge lamp is for example the radiator from the patent disclosure document of Japanese patent application HEI 2-7353 in which a discharge vessel is filled with a discharge gas which forms excimer molecules and in which excimer molecules are formed by a dielectric barrier discharge which is also called an ozonizer discharge or a corona, as is described in the "Discharge Handbook", Elektroassociation, Jun. 1989, 7th edition, page 263, Japan. In the radiator light is emitted from the above described excimer molecules.

A dielectric barrier discharge lamp between the electrodes which surround a discharge plasma space has one dielectric or two dielectrics. FIG. 1 shows a dielectric barrier discharge lamp 1 in which two dielectrics 5 and 6 are present. In FIG. 1 the lamp bulb 9 acts as the dielectrics 5 and 6.

In the operation of the dielectric barrier discharge lamp 1 an AC voltage with a high frequency of for example 10 kHz to 200 kHz and 2 kV to 10 kV is applied to the electrodes 3, 4 of their two poles. Due to the dielectrics 5 and 6 between the discharge plasma space 2 and the electrodes 3 and 4 the current flows from the electrodes 3 and 4, not directly into the discharge plasma space 2, but current flows due to the fact that the dielectrics 5 and 6 act as capacitors. This means that on the surfaces of the dielectrics 5 and 6 on the side of the discharge plasma space 2 by the polarization of the dielectrics an equivalent electric charge is induced as according to the respective electrode 3 and 4 which however has the opposite sign. Between the dielectrics 5 and 6 which surround the discharge plasma space and which are arranged opposite one another, a discharge occurs.

Since along the surfaces of the dielectrics 5 and 6 on the side of the discharge plasma space 2 only little current flows, in the area in which the discharge takes place the electrical charge induced on the surfaces of the dielectrics 5 and 6 on the side of the discharge plasma space 2 is neutralized by the electrical charge moved by the discharge, by which the electrical field of the discharge plasma space is made smaller. The discharge current therefore soon stops even if voltage continues to be applied to the electrodes 3 and 4. But in the case in which the voltage applied to the electrodes 3 and 4 rises, the discharge current remains uninterrupted.

When the discharge stops, after a discharge has taken place once, there is no repeated discharge until the polarity of the voltage applied to the electrodes 3 and 4 is reversed.

In the case of a dielectric barrier discharge lamp for example which is filled with xenon gas, the xenon gas is separated by the discharge into ions and electrons, by which a xenon plasma forms. In this plasma xenon which has been excited to a certain energy level is bound, by which excimer molecules are formed. The xenon excimers are dissociated after a certain lifetime. The energy released in this process is emitted as photons with vacuum UV wavelengths. It is necessary to form these excimer molecules with high efficiency so that the dielectric barrier discharge lamp is operated as a vacuum UV light source with high efficiency.

Here a major factor which prevents formation of the excimer molecules with high efficiency during discharge is that the discharge plasma is excited to an energy level which does not contribute to formation of the excimer molecules.

Electron motion of the discharge plasma immediately after starting the discharge takes place in groups. The energy is high, but the temperature is low. In this state there is a great probability that the discharge plasma will pass into a resonant state which is necessary for formation of the excimer molecules. When the discharge duration becomes longer, the electron motion of the plasma gradually passes into a thermal state, i.e. into the thermal equilibrium state which is called the "Maxwell-Boltzman distribution". This raises the plasma temperature, and the probability of passage to a more highly excited state in which no excimer molecules can be formed becomes greater.

Also, when excimer molecules are formed are there furthermore cases in which the excimer molecules are destroyed by a subsequent discharge before they emit the photons expected after the lifetime expires and are dissociated in a natural manner. In the case of the xenon excimer, in practice after starting the discharge until photon emission with the vacuum UV wavelengths a time interval of about 1 microsecond is necessary. A subsequent discharge and repeated discharge in this time interval reduce the efficiency of the excimer emission.

It becomes apparent that it is most important to reduce as much as possible the energy of the subsequent discharge once the discharge has started.

Also in the case of a short discharge duration the probability of passage to a more highly excited state likewise becomes greater when the energy added in this discharge time interval is too great. The plasma which has passed into a more highly excited state emits only IR radiation, relaxes, and increases the lamp temperature. But it does not contribute to excimer emission.

This means that discharge driving must be done by which excitation of the discharge plasma is suppressed to the energy level which does not contribute to formation of the excimer molecules. In this respect a conventional light source device with a dielectric barrier discharge lamp is not satisfactory.

To achieve high efficiency of the excimer emission by all pulse discharges including of a dielectric barrier discharge lamp, Japanese patent disclosure document HEI 1-243363 was advanced. Here the above described condition is met that the energy of the following discharge is reduced as much as possible once a discharge has started. However it has only been described in this suggestion which parameters must be controlled to achieve high efficiency of the excimer emission. But here effective conditions of the parameter values are not specifically shown. Especially in the case of a dielectric barrier discharge lamp is it very difficult to find optimum conditions because the application of a voltage to the discharge plasma space and introduction of a current via the dielectrics must be done and the degree of freedom is low in the control of this voltage and current.

To improve the efficiency of the dielectric barrier discharge lamp, for example Japanese patent disclosure document HEI 8-508363 was advanced. In this proposal however no specific circumstances are described which, to achieve suppression of the excitation of the discharge plasma to the energy level which does not contribute to formation of the excimer molecules, is truly effective to effect the above described formation of the excimer molecules with high efficiency.

Japanese patent disclosure document HEI 1-163006 was named for example as an improvement proposal with respect to the driving waveform of a fluorescent lamp using a dielectric barrier discharge. Here it is described that the radiance of the fluorescent lamp is increased by driving with trains of square-wave pulses with a positive and a negative polarity or with triangular waves using an alternating current. In this publication the result of a test is described in which for the trains of square-wave pulses or triangular waves in conjunction with one frequency and a pulse duty height the change of radiance was studied with respect to the change of the applied voltage. Here the increase of the efficiency compared to conventional sinusoidal driving is described.

A feed device in practice comprises however one high voltage transformer. It is therefore impossible to achieve ideal trains of square-wave pulses and triangular waves. Due to the interaction between the output impedance and the lamp impedance of the feed device, the waveform becomes blunt, and the sinusoidal voltage is partially applied by a resonance. In the case in which for one such real feed device a deviation from an ideal triangular wave form is present, each component in the deviation is harmful. A practical light source device which is economical cannot be designed or produced to the extent it is not clarified to what degree a deviation can be allowed.

SUMMARY OF THE INVENTION

Therefore the object of the invention is to devise a dielectric barrier discharge lamp in which excimer molecules are produced with high efficiency and which can be operated as a vacuum UV light source with high efficiency.

The object is achieved as claimed in the invention as follows:

(1) In a light source device with a dielectric barrier discharge lamp which has a dielectric barrier discharge lamp (1) and a feed device (7) for application of a high voltage to the above described electrodes (3, 4) of the above described dielectric barrier discharge lamp (1), the dielectric barrier discharge lamp (1) having a discharge space (2) filled with a discharge gas which produces excimer molecules by a dielectric barrier discharge, and there being dielectrics (5, 6) in the dielectric barrier discharge lamp (1) between at least one of the electrodes (3, 4) of the two poles for inducing the discharge phenomenon in the discharge gas and the above described discharge gas, the above described feed device (7) applies a high voltage with an essentially periodic waveform via a set-up transformer (8) to the above described dielectric barrier discharge lamp (1), and condition Vy/Vx≦1.0 is satisfied, when an instant (K) is considered which corresponds to the time of starting of the discharge of the voltage waveform applied to the lamp and when the voltage at the above described point (K) which corresponds to the time of starting of the discharge of the voltage waveform applied to the lamp is labelled Vk;

the voltage applied to the lamp upon completion of the discharge just before a discharge to which the above described point (K) belongs, is labelled Vf, the point (K) corresponding to the time of starting of the discharge of the voltage waveform applied to the lamp;

the voltage applied to the lamp at a point (U5) is labelled Vh, this point showing the maximum of the absolute value of the voltage applied to the lamp in the time interval from the time of transition of the above described point (K) to the next change of polarity of the voltage applied to the lamp, and the point (K) corresponding to the time of starting of the discharge of the voltage waveform applied to the lamp;

the voltage applied to the lamp at a point (U4) of the voltage waveform applied to the lamp is labelled Vb, this point showing the minimum of the absolute value in a closed gap between the above described point (K) and the above described point (U5), the point (K) corresponding to the time of starting of the discharge of the voltage waveform applied to the lamp and the point (U5) showing the maximum of the absolute value of the voltage applied to the lamp;

the absolute value of the difference Vk−Vf being labelled Vx; and the absolute value of the difference Vh−Vb being labelled Vy.

(2) The object is furthermore achieved as claimed in the invention by the voltage Vk at the flex point (K) which occurs for the voltage waveform applied to the lamp when the voltage rises or drops being used for the voltage Vk at the point (K) which corresponds to the time of starting of the discharge of the voltage waveform applied to the lamp.

(3) The object is furthermore achieved as claimed in the invention by a fluorescent body being applied to the surfaces of the dielectric which are opposite the discharge plasma space.

DETAILED DESCRIPTION OF THE INVENTION

To achieve the object of the invention, i.e., to form the excimer molecules with high efficiency, the excitation of the discharge plasma to the energy level which does not contribute to formation of excimer molecules must be suppressed. To do this it is feasible if the discharge is closed as promptly as possible when the voltage applied to the lamp increases with a finite degree of multiplication, and the ignition voltage is reached as soon as the discharge is started.

Figure 1:
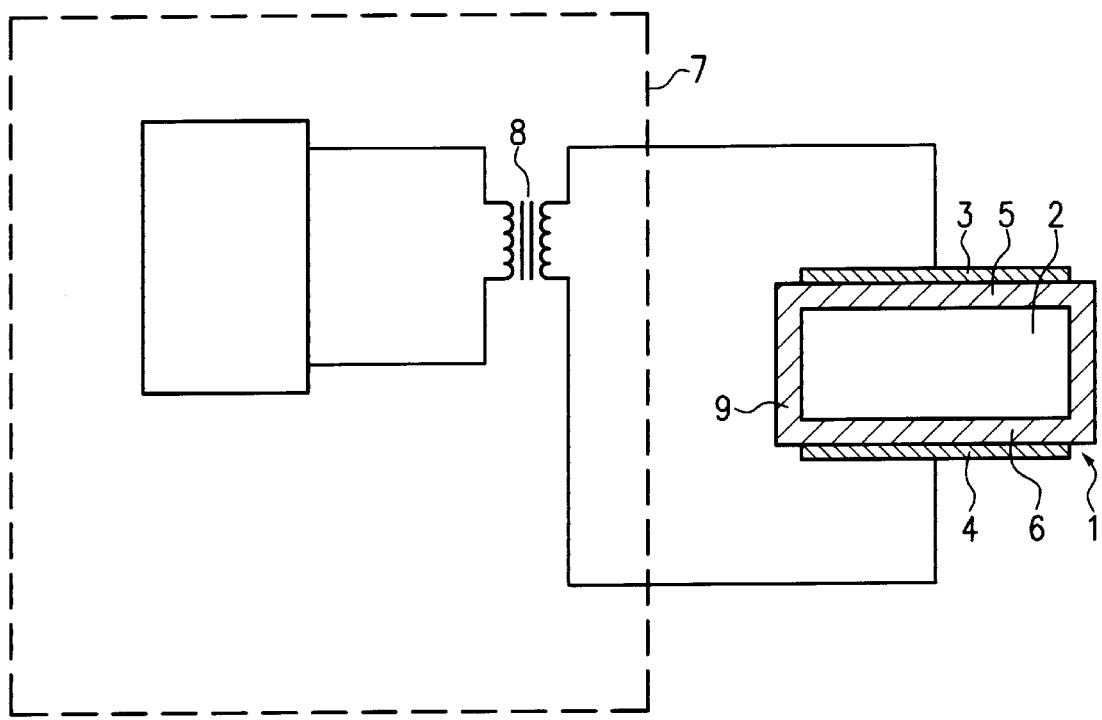
FIG. 1 shows a schematic of a dielectric barrier discharge lamp in which there are two dielectrics 5 and 6.
Figure 2:
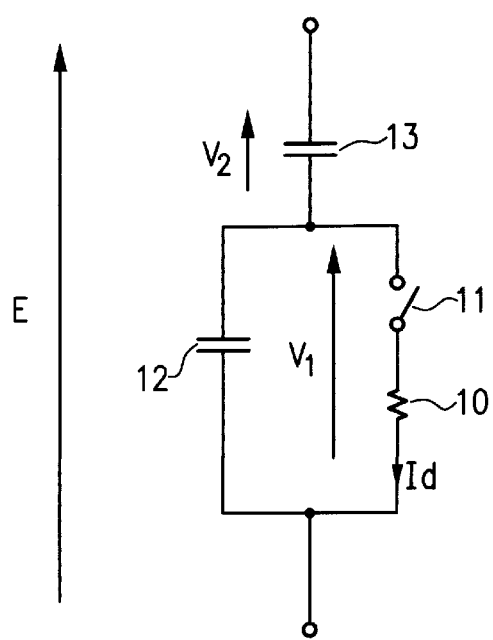
FIG. 2 shows a schematic of an equivalent circuit which shows the operation of a dielectric barrier discharge lamp 1 as an electrical circuit.

In operation of the dielectric barrier discharge lamp 1 as an electrical circuit, the discharge path of the discharge plasma space 2 is formed by a series connection of a resistor 10 to a switch 11, as is shown in FIG. 2. In a dielectric barrier discharge lamp 1, between the electrodes 3, 4 and the discharge plasma space 2 there are dielectrics 5, 6 which act as capacitors in the sense of an electrical circuit. But in the case in which there are two dielectrics, a single capacitor 13 can be imagined in which the respective capacitors are series connected.

By means of the arrangement in which this capacitor is inserted into the discharge plasma space 2 in a series connection, the discharge current flows in the dielectric barrier discharge lamp 1 only in a certain time interval directly after the change of polarity of the voltage applied to the lamp. Thus an idle time duration of the discharge naturally arises when no pulse voltage is applied with an idle time interval in which the voltage applied to the lamp is set essentially to 0.

If the voltage in the discharge plasma space 2 has not reached the ignition voltage, a discharge does not occur. It is therefore unnecessary that the rising speed or the falling speed of the voltage applied to the lamp be rapid.

The discharge plasma space 2 inherently also forms a capacitor 12. When the discharge is started, most of the energy that has been charged in this capacitor is consumed for the discharge. It therefore becomes apparent that it is a good idea if a feed device 7 does not additionally supply excess current after starting of the discharge of the dielectric barrier discharge lamp 1.

Next, the unit area of the wall surface of the lamp is examined.

The ignition voltage is almost automatically determined when the gas pressure and the distance of the discharge gap are determined. Furthermore the electrostatic capacity C1 of the capacitor 12 which is formed by the discharge plasma space is determined by the distance of the discharge gap. The minimum energy which is supplied to the plasma in the time interval after starting of a single discharge until its conclusion is the energy charged by the entire electrical charge which was charged in the capacitor 12 which is formed by the discharge space plasma. This is fixed by the lamp arrangement.

Suppression of the excitation of the discharge plasma to the energy level which does not contribute to formation of excimer molecules for purposes of formation of excimer molecules with high efficiency is best achieved under this condition of discharge of minimum energy.

This condition of discharge of minimum energy can be accomplished in principle because the discharge takes place using a feed device with an extremely large output impedance and by extremely slow rising of the voltage applied to the lamp. One such feed device however in the case of use as a light source device has the following defects in practice:

1. When the output impedance is high, a high operating speed for a periodic repeat discharge cannot be obtained.
2. Under this condition of discharge of minimum energy there are cases in which nonuniformity of the discharge occurs due to the influence of positional nonuniformity of the discharge gap in the lamp within a single lamp.

It is therefore necessary to make the voltage applied to the lamp higher than under the above described condition of discharge of minimum energy and furthermore to find a condition in an area in which a drop can be allowed in the efficiency of the excimer emission as a result of the increase of the voltage applied to the lamp in order to use a feed device with an output impedance which is so small that the required amount of light can be obtained and in order to furthermore obtain a light source device which can be used in practice, in which a uniform discharge can be adequately produced on the entire wall surface of the dielectric barrier discharge lamp.

The condition $Vy/Vx \leq 1.0$ (hereafter, formula 1) is satisfied, when a point K is considered which corresponds to the time of starting of the discharge of the voltage waveform applied to the lamp and where:

Vk is the voltage at the point K which corresponds to the time of starting of the discharge of the voltage waveform applied to the lamp;

Vf is the voltage applied to the lamp upon completion of the discharge just before a discharge to which the point K belongs, the point K corresponding to the time of starting of the discharge of the voltage waveform applied to the lamp;

Vh is the voltage applied to the lamp at a point U5, this point showing the maximum of the absolute value of the voltage applied to the lamp in the time interval from the time of transition of the point K to the next change of polarity of the voltage applied to the lamp, and the point K corresponding to the time of starting of the discharge of the voltage waveform applied to the lamp;

Vb is the voltage applied to the lamp at a point U4 of the voltage waveform applied to the lamp, this point showing the minimum of the absolute value in a closed gap between the point K and the point U5 the point K corresponding to the time of starting of the discharge of the voltage waveform applied to the lamp and the point U5 showing the maximum of the absolute value of the voltage applied to the lamp;

Vx is the absolute value of the difference Vk−Vf; and

Vy is the absolute value of the difference Vh−Vb.

With respect to the above described conditions of discharge with minimum energy, it is possible to make the discharge energy smaller than the above described minimum energy by the waveform of the voltage applied to the lamp being manipulated such that after starting the discharge the discharge is stopped before the entire electrical charge which has been charged in the capacitor 12 which is formed by the discharge plasma space is charged. This method however has a minor effect relative to its high technical difficulty.

Figure 3:
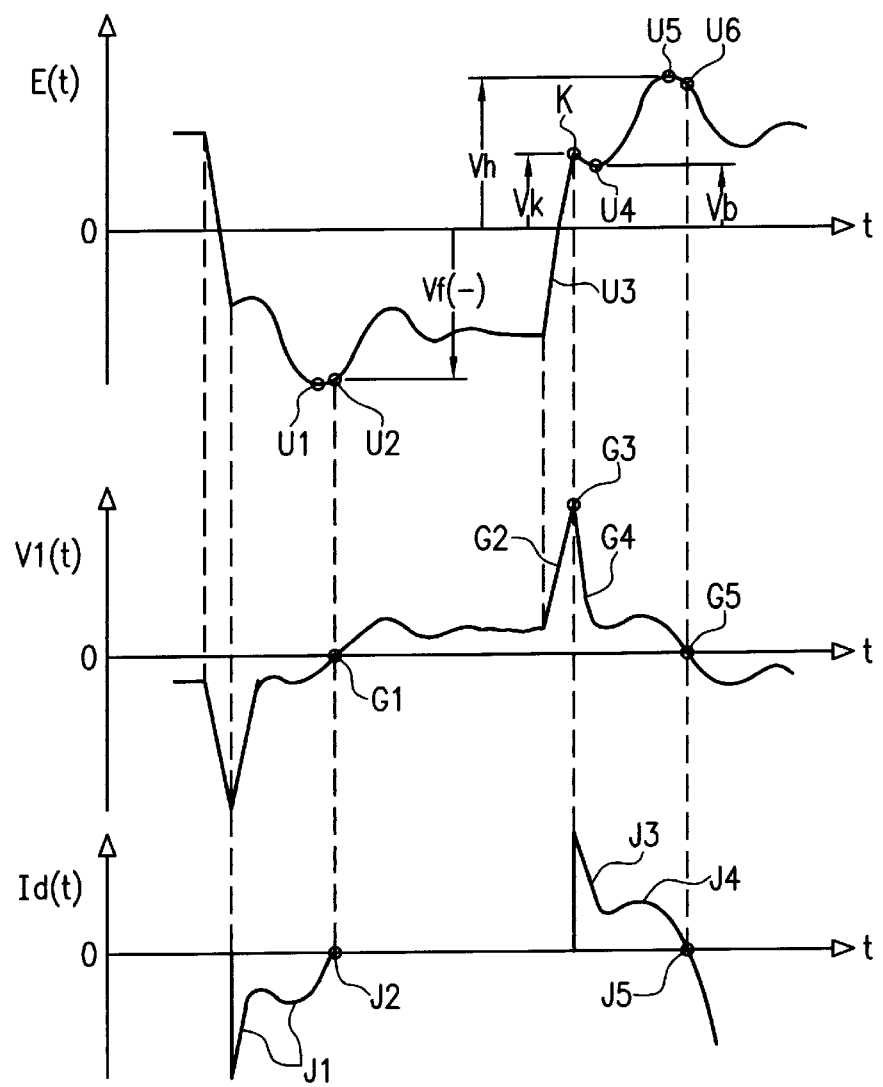
FIG. 3 shows a schematic of typical waveforms of a voltage applied to the lamp, a discharge gap voltage and a discharge current.

FIG. 3 is a schematic of typical waveforms of a voltage E(t) applied to the lamp, a voltage in the discharge plasma space 2, i.e. a discharge gap voltage V1(t) and a discharge current Id(t) at a practical feed device 7. At a point J2, in which the discharge current waveform J1 of the discharge which precedes the discharge to which a flex point K belongs is terminated, the discharge gap voltage is roughly the discharge maintenance voltage. As is shown using a point GI, it can be roughly considered to be 0 V.

Furthermore, the point U2 on the waveform of the voltage which is applied to the lamp and which corresponds to point J2 at which the discharge current is stopped is present at the maximum point U1 of the absolute value or in an area which had shortly passed by. In evaluation of a practical light source device the point U2 can be present at the maximum point U1 of the absolute value.

Starting from point U2 the change of the waveform of the voltage applied to the lamp as far as the flex point K is reduced by a factor of C2/(C1+C2) and corresponds exactly to the waveform of the discharge gap voltage.

Here reference number C1 labels the electrostatic capacity of the capacitor 12 of the discharge plasma space 2 and reference number C2 the electrostatic capacity of the capacitor 13 of the dielectrics 5 and 6. In the case of a dielectric barrier discharge lamp in which the two electrodes 3 and 4 are provided with the dielectrics 5 and 6, it can be imagined that C2 is produced by a series synthesis of the individual electrostatic capacity of the respective dielectric with one another.

The discharge gap voltage also changes quickly, like using the obliquely running line G2 when the polarity of the voltage applied to the lamp changes quickly according to the oblique line U3. The discharge begins at point G3 at which it has reached the ignition voltage.

When the discharge begins, the discharge current waveform J3 occurs acutely and as a result the discharge gap voltage drops quickly, as is shown by the obliquely running line G4, by which point G3 represents the peak.

The reason for the formation of the flex point K as shown in FIG. 3 at the voltage applied to the lamp for a feed device which can be used in practice is as follows:

According to the obliquely running line G4 the voltage applied to the lamp also drops according to the amount of rapid decrease of the discharge gap voltage, i.e. the voltage in the discharge plasma space. The feed device 7 attempts to compensate for the amount of this drop of the voltage applied to the lamp. Since however there is an inductive output impedance which is caused by a magnetic flux leakage of a set-up transformer 8 and the inductance of the cable, the compensation of the amount of decrease of the voltage applied to the lamp is delayed. As a result a convex flex point K arises in the direction to a greater absolute value.

Furthermore, due to the resonance between this inductive output impedance and the electrostatic capacity of the dielectric barrier discharge lamp 1 following the flex point K an oscillation component is mixed which corresponds to the voltage applied to the lamp.

As a result there are cases in which the minimum point U4 of the absolute value and the maximum point U5 of the absolute value occur on the waveform of the voltage applied to the lamp. According to these components, in the discharge current waveform J3 in the course of attenuation following the initial steep rising a rising area J4 occurs, as is illustrated in FIG. 3.

The effort is made as claimed in the invention to add the power necessary for a dielectric barrier discharge lamp and furthermore to prevent a drop of the UV radiant efficiency using this oscillation component.

As is shown using point G5, the discharge waveform J3 is terminated according to point J5 when the discharge gap voltage drops to roughly 0 V. The point U6 here on the waveform of the voltage applied to the lamp is essentially located in the vicinity of the maximum point U5 of the absolute value of the waveform of the voltage applied to the lamp. In an evaluation of an actual light source device the point U6 can agree with the maximum point U5 of the above described absolute value.

Figure 4:
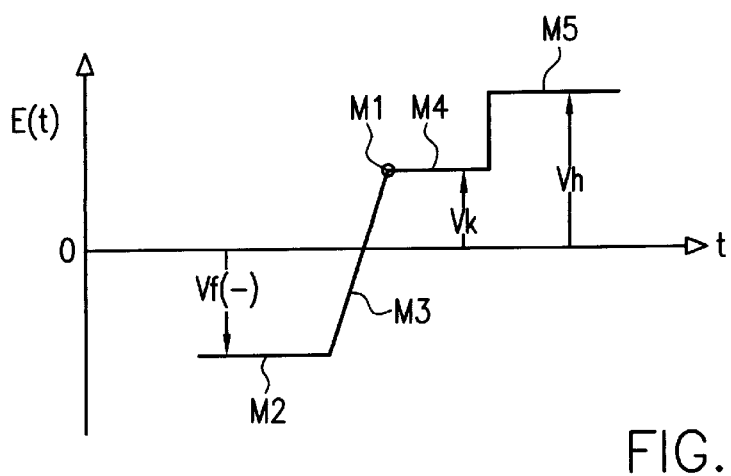
FIG. 4 shows a schematic of a voltage waveform applied to the lamp as a model.

To illustrate the physical meaning of the condition in the invention described by formula 1 above, using FIG. 4 a quantitative analysis of the discharge phenomenon is attempted, FIG. 4 showing the actual waveform of the voltage applied to the lamp according to FIG. 3 as a model.

In FIG. 4 a flat area M2 corresponds to the point U2 on the waveform of the voltage applied to the lamp at the time of completion of the previous discharge according to FIG. 3, i.e. a state in which the voltage applied to the lamp at point U1 is Vf. The obliquely running line M3 in FIG. 4 corresponds to the obliquely running line U3 in the starting area of the voltage applied to the lamp in FIG. 3. The point M1 is FIG. 4 corresponds to the flex point K as shown in FIG. 3. The flat area M4 in FIG. 4 roughly represents the area in FIG. 3 after the transition of the flex point K to the minimum point U4 of the absolute value. Its voltage is Vk. The flat area M5 in FIG. 4 corresponds to the maximum point U5 of the absolute value as shown in FIG. 3. Its voltage is Vh.

In FIG. 4 the discharge gap voltage is in a state in which the voltage applied to the lamp is in the flat area M2, at 0 V. A change of the voltage applied to the lamp proceeding from this state until point M1 is reached is labelled (Vk−Vf). The discharge gap voltage changes accordingly from 0 to Vg. Here the following applies:

$$Vg = C2/((C1+C2)(Vk-Vf)) \qquad \text{(formula 2)}$$

According to the energy which is supplied for the discharge current waveform J3 during the attenuation period after the initial steep rising of the discharge plasma, we would like to determine the energy W1 which is supplied to the discharge plasma when the discharge starts at point M1.

Figure 5:
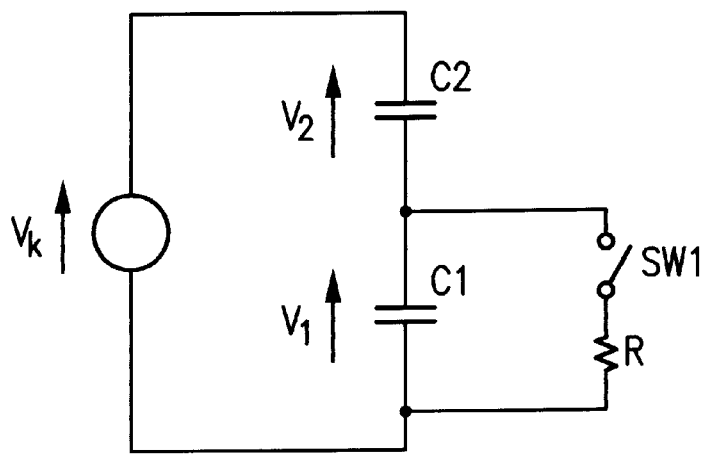
FIG. 5 shows a schematic of an equivalent circuit for analysis of the discharge of the dielectric barrier discharge lamp.

FIG. 5 shows the dielectric barrier discharge lamp as an equivalent circuit. Here reference number C1 labels the electrostatic capacity of the capacitor 12 of the discharge plasma space 2 and reference number C2 the electrostatic capacity of the capacitor 13 of the dielectrics 5 and 6. Furthermore, reference letter R labels the resistance of the discharge plasma. If the initial charging voltage of C1 is labelled Vg, the total energy W1 which is consumed by closing the switch SW1 in R is determined as followed:

$$W1 = (\tfrac{1}{2})(C1+C2)Vg^2 \qquad \text{(formula 3)}$$

At the time of the end of power consumption in R, voltages V1 and V2 of C1 and C2 are represented as follows:

$$V1=0, \; V2=Vk \qquad \text{(formula 4)}$$

If (formula 2) is used for Vg in FIG. 3, W1 is determined as follows:

$$W1 = (\tfrac{1}{2})(C2^2)/((C1+C1)(Vk-Vf)^2 \qquad \text{(formula 5)}$$

In this case the absolute value of the difference (Vk−Vf) is labelled Vx.

In FIG. 4, according to formula 4 the discharge gap voltage is 0 and the voltage of the dielectric is Vk when the voltage applied to the lamp is located in the flat area M4, i.e. in the end state.

According to the energy which is delivered to the discharge plasma present in the rising area J4 which forms in the course of attenuation of the discharge current waveform J3 and in the time interval thereafter, the energy W2 will be determined which is delivered to the discharge plasma in a change from this state proceeding to the state of the flat area M5 with the voltage Vh.

Figure 6:
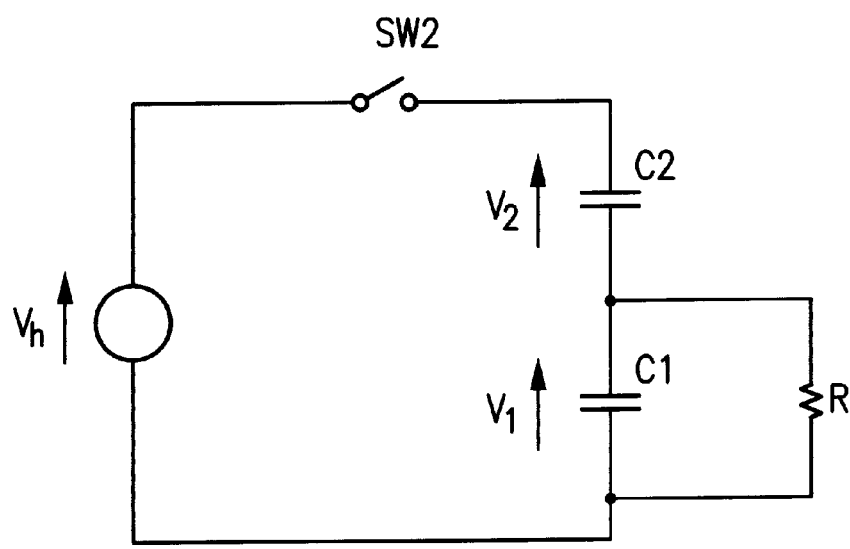
FIG. 6 shows a schematic of an equivalent circuit for analysis of the discharge of the dielectric barrier discharge lamp.

In the equivalent circuit in FIG. 6 the total energy W2 which is consumed by closing SW2 in R is determined as follows when the initial charging voltages of C1 and C2 are represented as follows by citing the above described formula 4:

$$V1=0, V2=Vk \quad \text{(formula 6)}$$

$$W2=(\tfrac{1}{2})(C2^2)/((C1+C1)(Vh-Vk)^2) \quad \text{(formula 7)}$$

Here it is considered how W1 and W2 will be corrected when between the flex point K and the maximum point U5 of the absolute value the minimum point of the absolute value, i.e. the point U4, is present, with an absolute value which is smaller than Vk, as in the waveform of the voltage applied to the lamp according to FIG. 3.

As is apparent from FIG. 3, the peak value of J3 of the discharge current waveform is in the vicinity of the instant of the flex point K of the waveform of the voltage applied to the lamp. At the instant of the minimum point U4 of the absolute value the peak point of J3 of the discharge current waveform has already been exceeded. It becomes apparent that the effect of the presence of the minimum point U4 of the absolute value in the waveform of the voltage applied to the lamp on the above described energy W1 therefore is only little and negligible.

Since on the other hand it is feasible that for the waveform of the voltage applied to the lamp the energy W2 which is delivered to the discharge plasma in the time interval after exceeding the minimum point U4 of the absolute value until the maximum point U5 of the absolute value, under the above described initial condition (formula 6) a change to V2=Vb is effected, formula 7 is finally corrected as follows:

$$W2=(\tfrac{1}{2})(C2^2)/((C1+C1)(Vh-Vb)^2) \quad \text{(formula 8)}$$

In this case the absolute value of the difference (Vh−Vb) is labelled Vy.

In formula 5 W1 labels the sum of the discharge energy under the above described condition of discharge of the minimum energy and the discharge energy for which as a result of a small output impedance of the feed device the voltage applied to the lamp in the discharge in the vicinity of the flex point K is maintained and which thus flows via the capacitor 13 into the discharge plasma space 2 which consists of the dielectrics 5 and 6. W1 is therefore the so-to-speak inevitable energy for building a feed device which can be used in practice.

W2 in formula 8 is conversely the energy which is necessarily introduced to prevent nonuniform discharge within a single lamp by the effect of positional nonuniformity of the discharge gap in the lamp.

By the above described analysis of the discharge phenomenon it becomes apparent that Vx and Vy are important factors for achieving the object of the invention. That Vy is made smaller than Vx corresponds specifically to the above described condition that the energy of the following discharge is reduced as much as possible once the discharge is started.

In this way excitation of the discharge plasma can be suppressed to the energy level which does not contribute to formation of the excimer molecules. As a result, a light source with vacuum UV wavelengths and with high efficiency is accomplished. The numerical values of the right side (formula 1) were obtained by the effort of the inventors.

Figure 7:
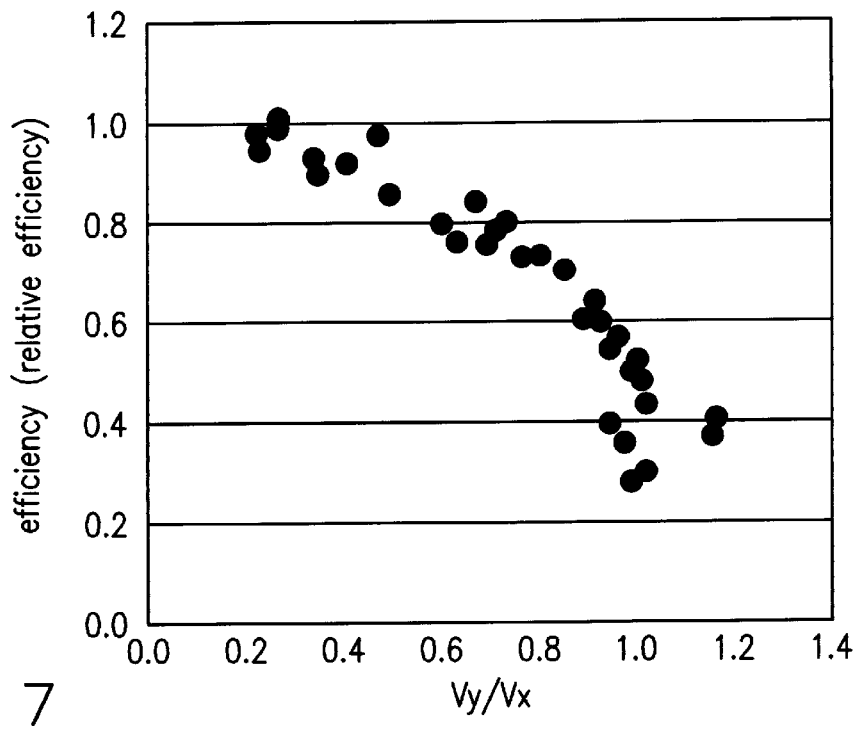
FIG. 7 shows a schematic of the test data which show the relation between Vy/Vx and the efficiency.

In this case, with respect to Vx and Vy a test was run with regard to the efficiency of the excimer emission. FIG. 7 is a graphic representation of the test result. The scale of the y-axis in FIG. 7 is a relative scale for which the plotted point with the highest efficiency is labelled 1. In the following the test conditions which are common to all the plotted points are described:

Inverter circuit: half-bridge system
Frequency: 20 kHz, 40 kHz, 80 kHz
Inductance on the primary side of the transformer: 1.1 mH
Inductance on the secondary side of the transformer: 630 mH
Transformer coupling coefficient: 0.9993
Dielectric:fused silica glass—thickness 1 mm
discharge gas:xenon—pressure 33 kPa
discharge gap: 4.3 mm
electrostatic capacity of the lamp when there is no discharge: 12 pF In the test, the frequency which is supplied to the inverter circuit on the primary side and the DC voltage were changed differently. Based on the acquired waveform of the voltage applied to the lamp the value of Vy/Vx was computed and designated the value in the direction of the x-axis. Furthermore, the ratio of the power which is supplied to the dielectric barrier discharge lamp to the amount of UV radiation measured here was computed and is designated as the value in the direction of the y-axis. The respective result was recorded.

Measurement of the amount of UV radiation was done by a sensor for UV illuminance which was formed by combining a fluorescent body with a silicon photodiode being located in a nitrogen gas atmosphere with a certain distance from the lamp and the measurement being taken based on the ascertained values of the illuminance. An integrated voltage waveform of the lamp current was produced by a film capacitor which is inserted into the lamp in a series connection. The power which was supplied to the dielectric barrier discharge lamp was measured by the area of a Lissajous figure which is formed by the integrated voltage waveform of the lamp current and the waveform of the voltage applied to the lamp.

As is apparent from FIG. 7, the efficiency is reduced when Vy/Vx is increased to prevent the influence of the positional nonuniformity of the discharge gap in the lamp and for similar reasons. When Vy/Vx rises above 1.0, it is recognized that the efficiency drops quickly and the variance of the values of the accomplished efficiency increases. This indicates that Vy/Vx≦1.0, preferably Vy/Vx≦0.9, is necessary to accomplish a condition in the area in which a decrease of the efficiency of the excimer emission can be allowed.

Furthermore, it becomes apparent that in the area in which Vy/Vx is less than or equal to 0.8, the degree of change of the efficiency with respect to the change of Vy/Vx is less than in the other areas and that therefore high efficiency is stably accomplished. Furthermore, in this area the voltage applied to the lamp becomes even less. Therefore there is the advantage that production of high voltage elements such as a transformer and the like and the insulation measure for safety can be easily done.

In practice, under the above described test conditions according to FIG. 7 for the waveform of the voltage applied to the lamp by which Vy/Vx=1.0 is obtained, during operation with 80 kHz, it was 8.8 kVpp (the voltage between the peak values). For a waveform of the voltage applied to the lamp by which Vy/Vx=0.8 is obtained, it decreased to 6.7 kVpp. To build a light source device with high efficiency with low cost in an industrial application it is therefore advantageous that Vy/Vx≦0.8.

When Vy/Vx is less than or equal to 0.5, an efficiency is obtained which is always essentially near the maximum. The voltage applied to the lamp becomes even less. In practice it decreased to 4.5 kVpp under the above described test conditions according to FIG. 7 for a waveform of the voltage applied to the lamp by which Vy/Vx=0.5 is obtained during operation with 80 kHz. It is therefore apparent that to achieve higher efficiency and low costs of the light source device it is even more advantageous if Vy/Vx≦0.5.

If the ratio of the two sides to one another according to Formula 8 and Formula 5 is determined, W2/W1=(Vh−Vb)$^2$/(Vk−Vf)$^2$ is obtained. If Vx and Vy are applied to the right side of this formula, W2/W1=(Vy/Vx)$^2$. Vy/Vx≦1.0 therefore means W2/W1≦1.0. This condition means that it is in an area in which a drop of the efficiency of excimer emission can be allowed.

As becomes apparent from analysis of the above described discharge phenomenon, it is feasible to take as the voltage Vb the voltage Vk at a point which corresponds to starting of the discharge of the waveform of the voltage applied to the lamp, when on the waveform of the voltage applied to the lamp the minimum point U4 of the absolute value is absent between the point which corresponds to starting of the discharge of the waveform of the voltage applied to the lamp, i.e. the flex point K, and the maximum point U5 of the absolute value is not present.

Furthermore, it can be interpreted that under the condition according to the invention described in claim 1 the voltage Vh and Vb are identical to the voltage Vk when the point U5 is not present to show the maximum absolute value. This case can be considered ideal with respect to efficiency because the above described condition of discharge of the minimum energy is approached. It is however recommended that care be exercised in use because nonuniformity of the discharge within a single lamp often occurs due to the influence of the positional nonuniformity of the discharge gap in the lamp, as was described above.

For an application in which this nonuniformity is not desired, it is more preferred that Vy/Vx≦0.1.

Here no problems occur when for the waveform of the lamp voltage E(t) both in the positive and also in the negative state condition Vx/Vy≦1.0 is met, as is shown in FIG. 3.

If however the condition Vx/Vy≦1.0 is satisfied only either in the positive or in the negative state and in the opposite state the condition Vx/Vy≦1.0 is not satisfied, the average of Vx/Vy in the positive state and of Vx/Vy in the negative state is computed. It is assessed depending on whether the condition is satisfied that this average is less than or equal to 1.0.

In the above described analysis of the discharge phenomenon V1=0 was used in formula 4. In this way however the intention is not to express that at a dielectric barrier discharge lamp in fact the discharge gap voltage reaches 0 and the discharge is stopped, but that this was a technique for model analysis for estimating the energy delivered to the discharge plasma, division having been done into an attenuation time interval directly after the initial steep rising in the discharge waveform J3 and, into a time interval of the rising area J4 which forms in the course of attenuation of the discharge waveform J3, and into the time interval afterward.

Furthermore, in accordance with the invention, at least in part a fluorescent body is applied to the dielectric surfaces opposite the discharge plasma space. In this way, a lamp can be obtained which emits visible radiation.

In the following one embodiment of the light source device as claimed in the invention with a dielectric barrier discharge lamp is described, in which the above described suppression of the excitation of the discharge plasma to the energy level which does not contribute to formation of excimer molecules was achieved for formation of excimer molecules with high efficiency.

Figure 8:
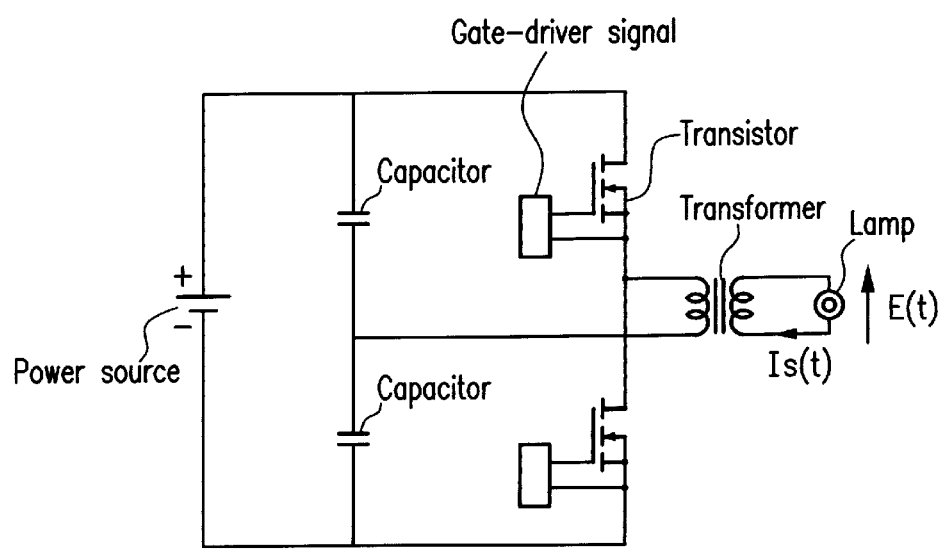
FIG. 8 shows a schematic of an operation circuit of a dielectric barrier discharge lamp using a half-bridge inverter.

FIG. 8 is a circuit diagram in which an operation circuit of a dielectric barrier discharge lamp is shown in simplified form using an inverter circuit of the half-bridge type.

Figure 9:
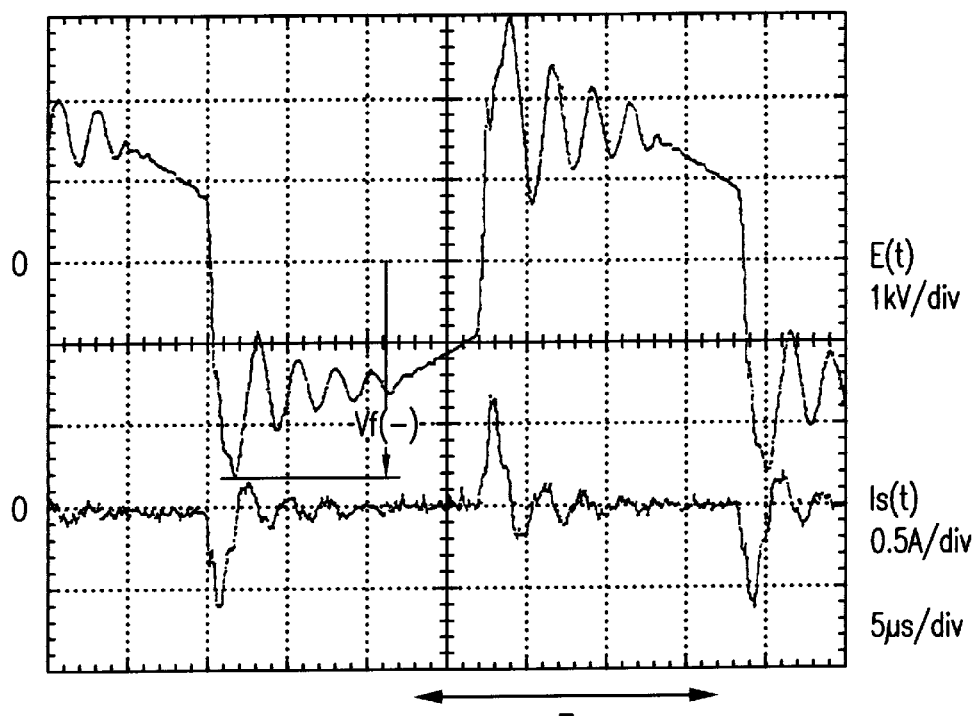
FIG. 9 shows a schematic of the actually measured data of a voltage waveform E(t) and a current waveform Is(t)

FIG. 9 is a schematic of the actually measured data of a voltage waveform E(t) and a current waveform Is(t) of a dielectric barrier discharge lamp 1.

Figure 10:
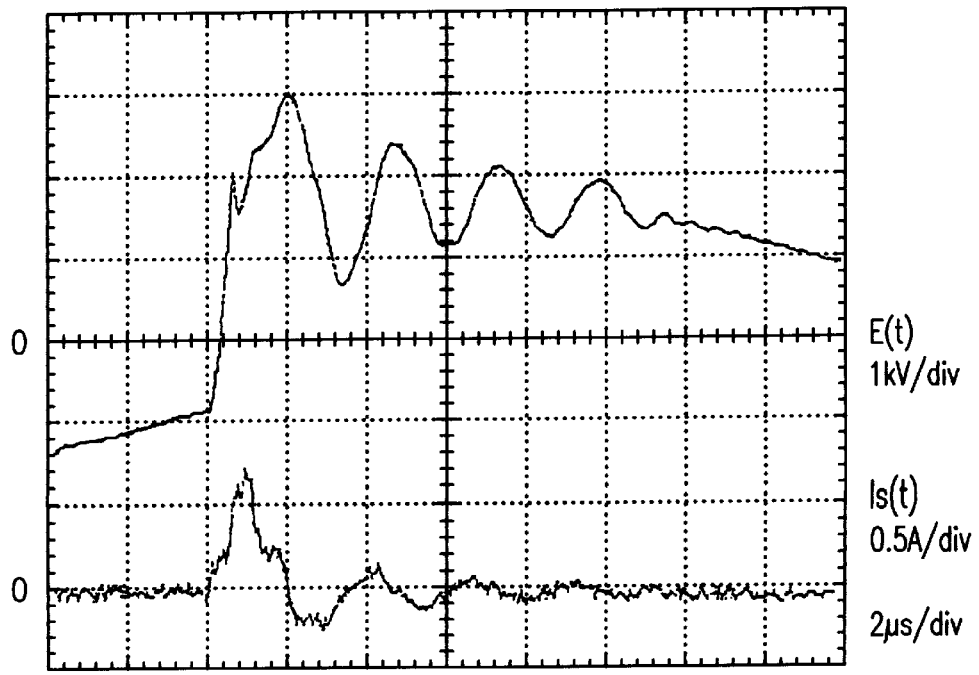
FIG. 10 shows a schematic of the actually measured data of a voltage waveform E(t) and a current waveform Is(t)

FIG. 10 is a schematic of a measurement in which the gap Z shown essentially in FIG. 9 was enlarged.

Figure 11:
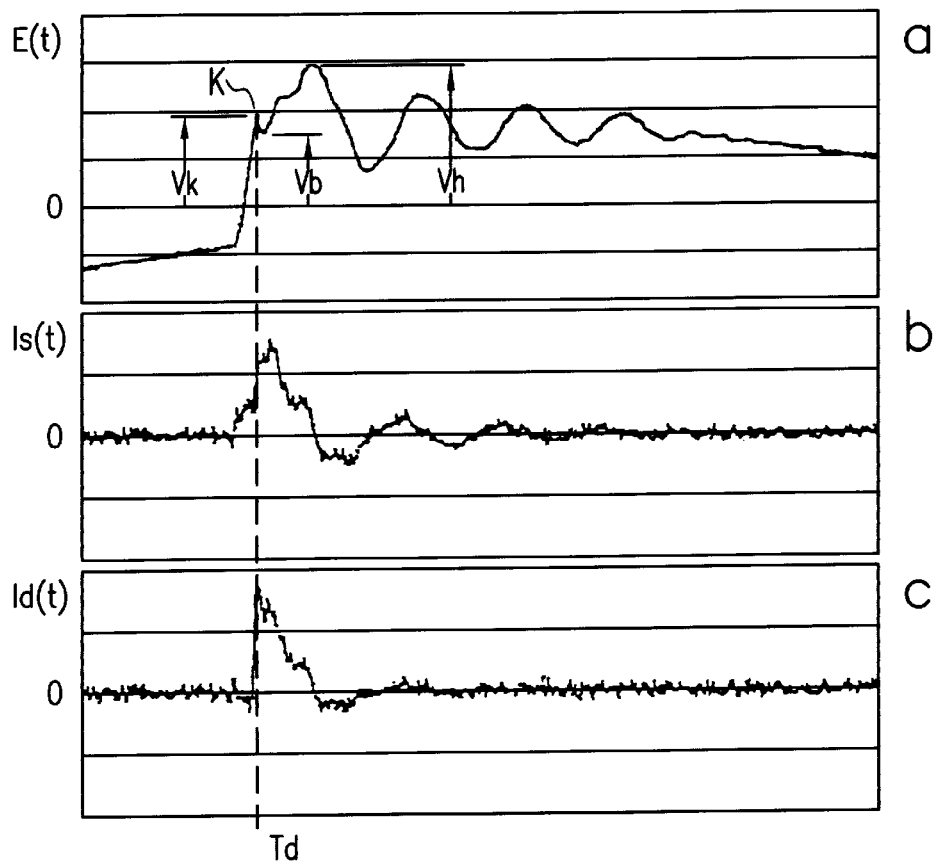
FIG. 11 shows a schematic of the waveform data in which computer analysis was done.

FIG. 11 is a schematic in which the waveforms as shown in FIG. 10 were computer analyzed and the discharge current waveform Id(t) was computed and they are shown together with the voltage waveform E(t) and the current waveform Is(t).

In the following the method for computing the discharge current waveform Id(t) based on the voltage waveform E(t) and the current waveform Is(t) as shown in FIG. 11 is described.

The discharge current waveform Id(t) can be fixed by the following formula using the following two coefficients F=1+ C1/C2 (formula 9) and Cv=C1+C3 F (formula 10):

Id(t)=F Is(t)−Cv dE(t)/dt (formula 11), the above described two coefficients being fixed by the following:

electrostatic capacity C1 of the capacitor 12 of the discharge plasma space 2;

electrostatic capacity C2 of the capacitor 13 of the dielectrics 5 and 6;

electrostatic stray capacity C3 which is present in the dielectric barrier discharge lamp in parallel.

This method does not have very high accuracy in an area with a small current value of the waveform obtained as a result because numerical differentiation is used. Since when starting the discharge rapid-start-up is shown, the method is without problems, especially if it is used for purposes of its determination.

In the following the analysis conditions and the test conditions in FIGS. 9, 10 and 11 are described:
C1: 35 pF
C2: 220 pF
C3: 15 pF
Frequency: 30 kHz
Inductance on the primary side of the transformer: 1.1 mH
Inductance on the secondary side of the transformer: 630 mH
Transformer coupling coefficient: 0.9993
Dielectric:fused silica glass—thickness 1 mm
discharge gas:xenon—pressure 33 kPa
discharge gap: 4.3 mm In FIG. 11 the discharge waveform Id(t) at time Td has a sharp rising. It becomes apparent that this is the instant of starting of the discharge. The flex point K is formed on the voltage waveform E(t) according to instant Td.

The voltage values Vk, Vb and Vh are given for computation of Vx and Vy in FIG. 11 and Vf in FIG. 9. In this case however Vf is negative. If these actually measured values are substituted in formula 1, Vy/Vx=0.30.

Another embodiment is described below.

Figure 12:
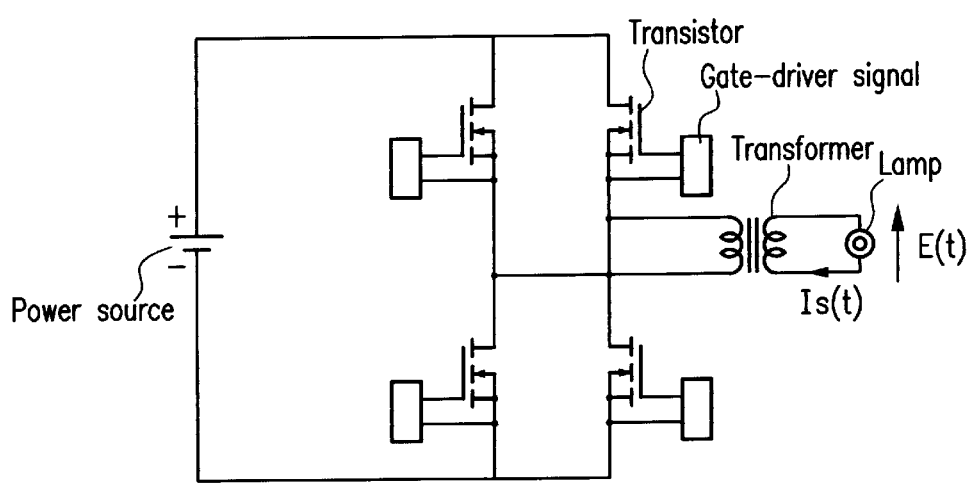
FIG. 12 shows a schematic of an operation circuit of a dielectric barrier discharge lamp using a full-bridge inverter.

FIG. 12 is a circuit diagram in which an operation circuit of a dielectric barrier discharge lamp using an inverter circuit of the full-bridge type is shown in simplified form.

Figure 13:
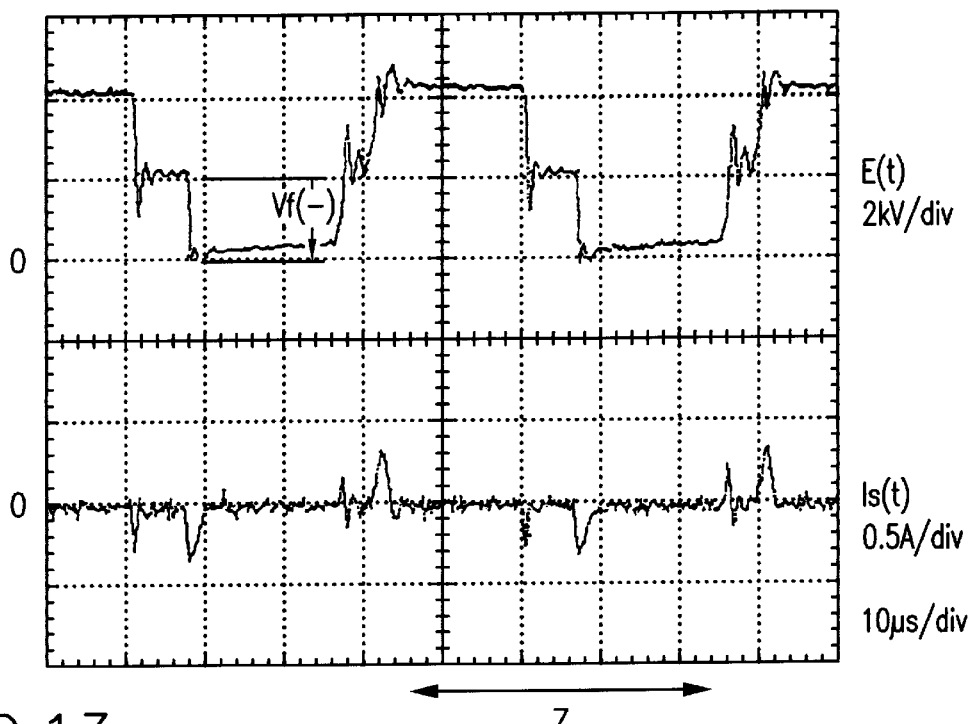
FIG. 13 shows a schematic of the actually measured data of a voltage waveform E(t) and a current waveform Is(t)

FIG. 13 is a schematic of the actually measured data of a voltage waveform E(t) and a current waveform Is(t) of a dielectric barrier discharge lamp 1.

Figure 14:
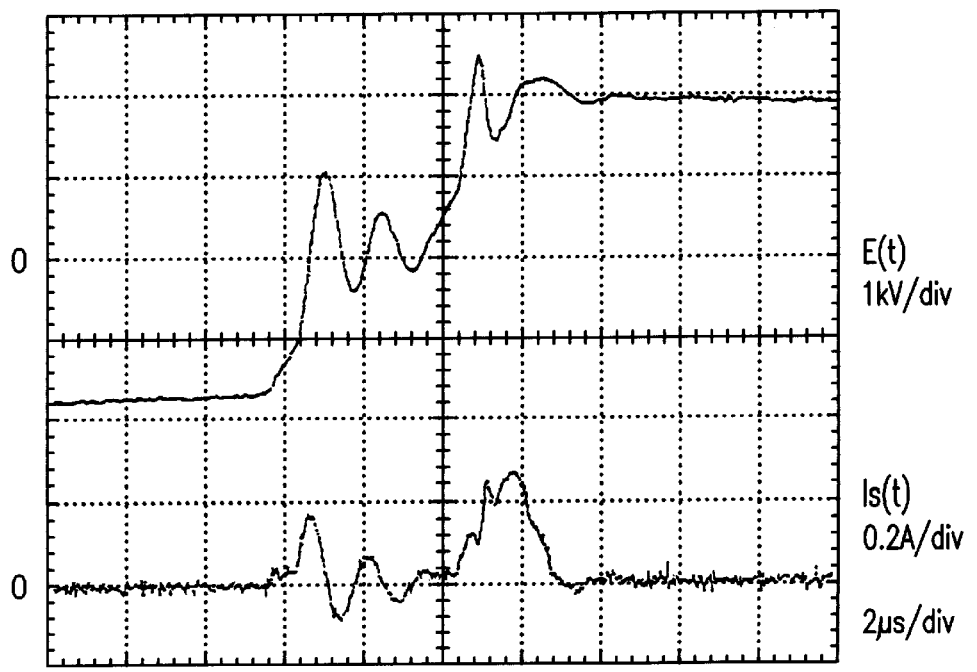
FIG. 14 shows a schematic of the actually measured data of a voltage waveform E(t) and a current waveform Is(t)

FIG. 14 shows a schematic of a measurement in which the gap Z which is shown essentially in FIG. 13 was enlarged.

Figure 15:
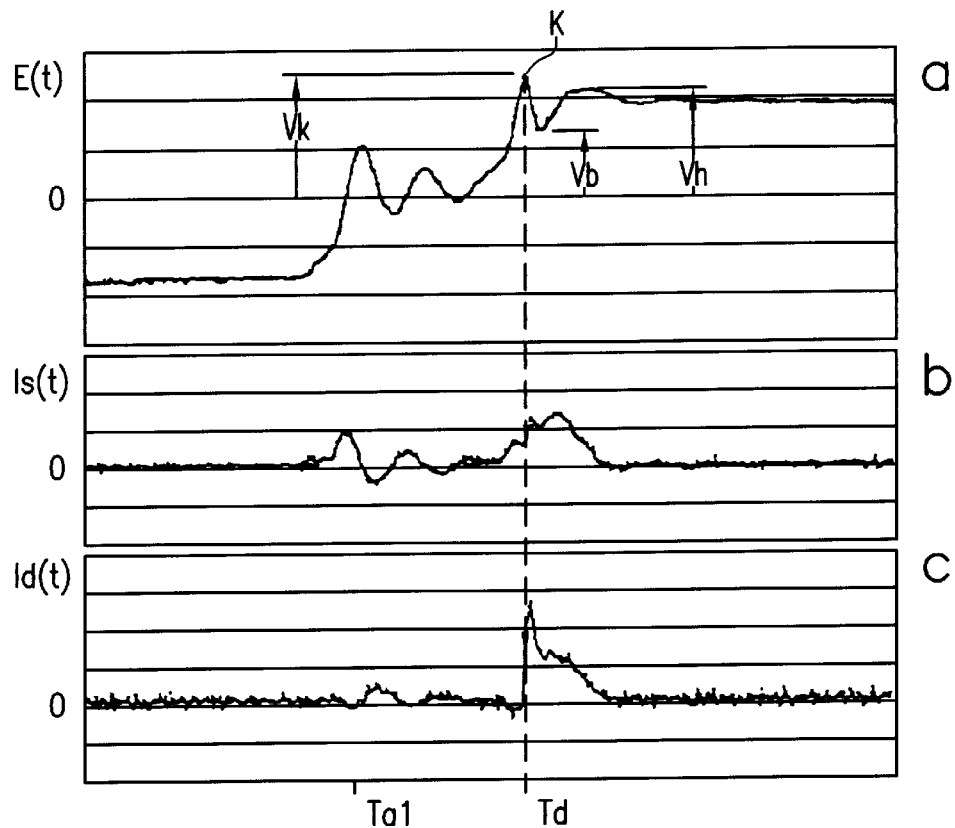
FIG. 15 shows a schematic of the waveform data in which computer analysis was done.

FIG. 15 shows a schematic in which the waveforms as shown in FIG. 14 were computer analyzed and the discharge waveform Id(t) was computed and they are shown together with the voltage waveform E(t) and the current waveform Is(t).

The analysis conditions and the test conditions in FIGS. 13, 14 and 15 are identical to the above described analysis conditions and the test conditions in FIGS. 9, 10, and 11, except that the frequency is 21 kHz. In FIG. 11 in the vicinity of instant Ta1 both the voltage waveform E(t) and also the current waveform Is(t) have large amplitudes. In the discharge waveform Id(t) however there is no reasonable amplitude. It is therefore shown that under these test conditions no discharge forms in the vicinity of instant Ta1. There are also cases in which depending on the conditions in the corresponding area a discharge forms even if operation with the same waveforms is done.

In FIG. 15 the discharge current waveform Id(t) at instant Td has a steep rise. It becomes apparent that this is the instant of starting of the discharge. The flex point K is formed on the voltage waveform E(t) according to time Td.

The voltage values Vk, Vb and Vh are given for computation of Vx and Vy in FIG. 11 and Vf in FIG. 13. In this case however Vf is negative. If these actually measured values are substituted in formula 1, Vy/Vx=0.18.

Another embodiment is described below.

Figure 16:
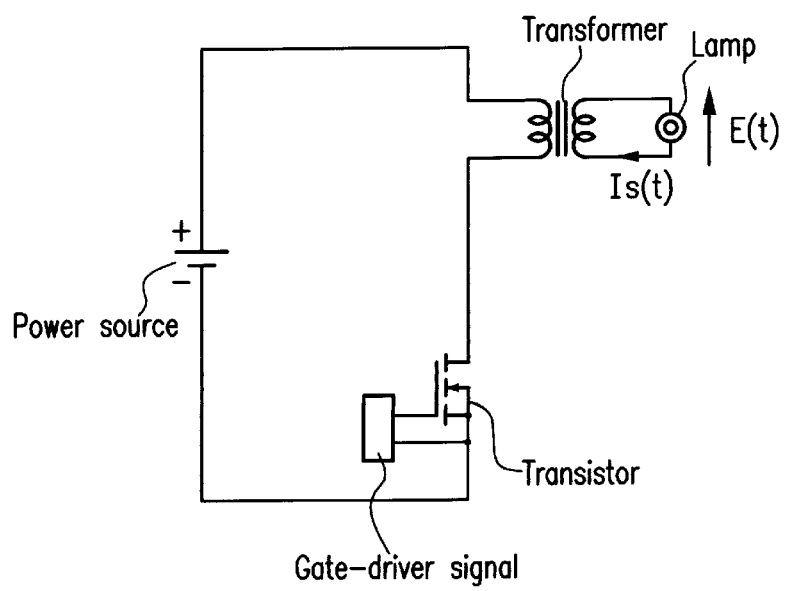
FIG. 16 shows a schematic of an operation circuit of a dielectric barrier discharge lamp using a fly-back inverter.

FIG. 16 is a circuit diagram in which an operation circuit of a dielectric barrier discharge lamp using an inverter circuit of the fly-back type is shown in simplified form.

Figure 17:
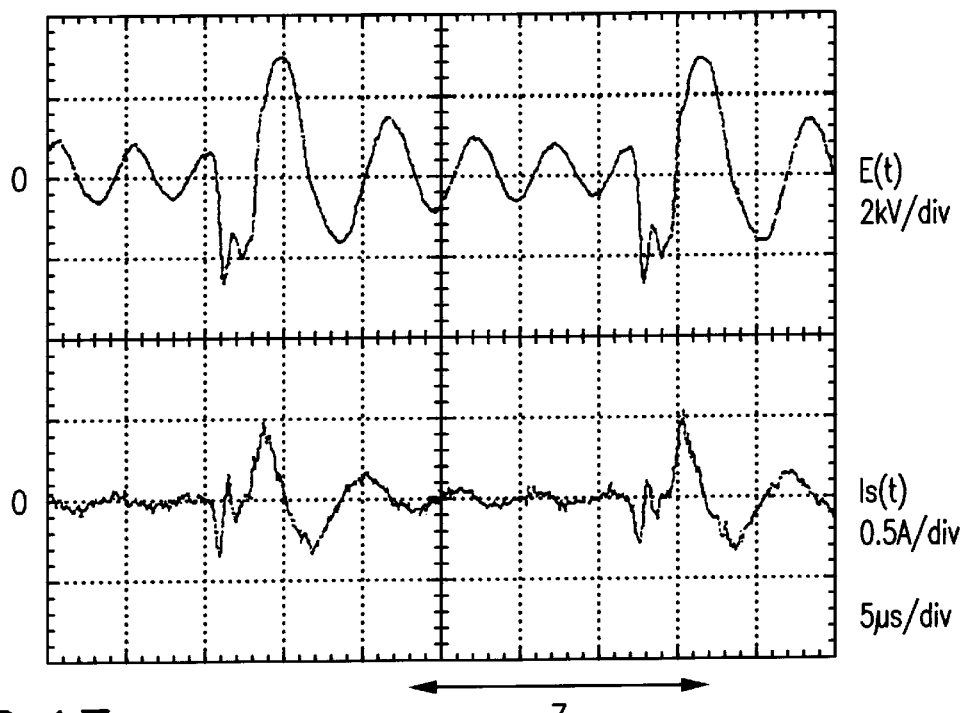
FIG. 17 shows a schematic of the actually measured data of a voltage waveform E(t) and a current waveform Is(t)

FIG. 17 is a schematic of the actually measured data of a voltage waveform E(t) and a current waveform Is(t) of the dielectric barrier discharge lamp 1.

Figure 18:
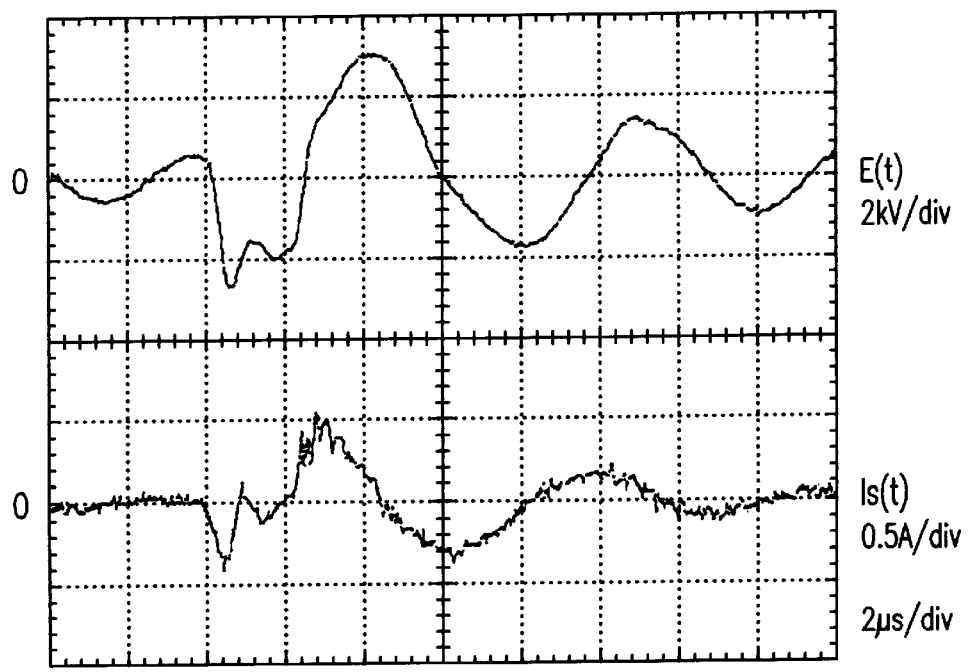
FIG. 18 shows a schematic of the actually measured data of a voltage waveform E(t) and a current waveform Is(t)

FIG. 18 is a schematic of a measurement in which the gap Z shown essentially in FIG. 17 was enlarged.

Figure 19:
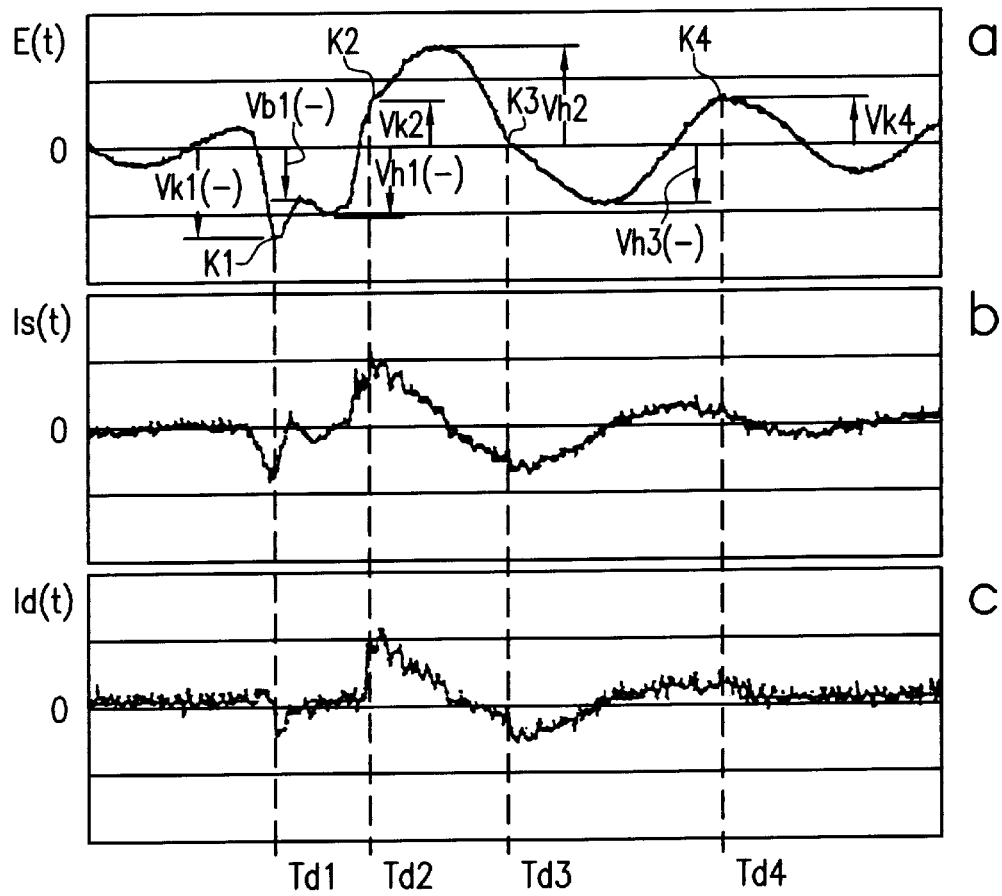
FIG. 19 shows a schematic of the waveform data in which computer analysis was done.

FIG. 19 is a schematic in which the waveforms as shown in FIG. 18 were computer analyzed and the discharge current waveform Id(t) was computed and they are shown together with the voltage waveform E(t) and the current waveform Is(t).

The analysis conditions and the test conditions in FIGS. 17, 18 and 19 are described.

C1: 35 pF
C2: 220 pF
C3: 15 pF
Frequency: 36 kHz
Inductance on the primary side of the transformer: 33 $\mu$H
Inductance on the secondary side of the transformer: 6.1 mH
Transformer coupling coefficient: 0.9930
Dielectric:fused silica glass—thickness 1 mm
discharge gas:xenon—pressure 33 kPa
discharge gap: 4.3 mm In FIG. 19 the discharge current waveform Id(t) has a steep rise two instants Td1 and Td1. It becomes apparent that they are the instants of starting of the discharge. On the voltage waveform E(t) one flex point K1 and one flex point K2 are formed according to instant Td1 and instant Td2 respectively. Of the two flex points, flex point K2 is relatively difficult to recognize. It can however be distinguished by the starting of the discharge current waveform Id(t) at instant Td2 being steep.

If furthermore the voltage waveform E(t) is accurately observed, at instant Td3 a flex point K3 and at instant Td4 a flex point K4 are detected which are similar to flex point K2. They can be assessed as the starting of the discharge based on the discharge current waveform Id(t).

In the case of computing the value of Vy/Vx based on the condition of the invention described in claim 1, the discharge started with respect to instant Td1 can be computed with Vf=Vk4, Vk=Vk1, Vb=Vb1 and Vh=Vh1 to FIG. 19. The discharge started at instant Td2 can likewise be computed with Vf=Vh1, Vk=Vk2, Vb=Vk2 and Vh=Vh2. Finally, the discharge started at instant Td3 can be computed with Vf=Vh2, Vk=0, Vb=0 and Vh=Vh3. The discharge started with respect to instant Td4 can likewise be computed with Vf=Vh3, Vk=Vk4, Vb=Vk4 and Vh=Vk4.

If however the contribution of the respective discharges at these four sites to the totality based on an area which is surrounded by the straight lines between discharge current waveform Id(t) and Id=0 is assessed, all the discharges except the discharge started at instant Td2 can be ignored, because the main discharge which substantially controls the efficiency is the discharge started at instant Td2. For this waveform therefore Vy/Vx=0.32 applies overall.

In the light source device as claimed in the invention with a dielectric barrier discharge lamp, feed device (7) via a set-up transformer (8) applies a high voltage with an essentially periodic waveform to the above described dielectric barrier discharge lamp (1), and the condition Vy/Vx$\leq$1.0 is satisfied when a point (K) is considered which corresponds to the instant of starting of the discharge of the voltage waveform applied to the lamp, and when the voltage at the above described point (K) which corresponds to the time of starting of the discharge of the voltage waveform applied to the lamp is labelled Vk;

the voltage applied to the lamp upon completion of the discharge just before a discharge to which the above described point (K) belongs, is labelled Vf, the point (K) corresponding to the time of starting of the discharge of the voltage waveform applied to the lamp;

the voltage applied to the lamp at a point (U5) is labelled Vh, this point showing the maximum of the absolute value of the voltage applied to the lamp in the time interval from the time of transition of the above described point (K) to the next change of polarity of the voltage applied to the lamp, and the point (K) corresponding to the time of starting of the discharge of the voltage waveform applied to the lamp;

the voltage applied to the lamp at a point (U4) of the voltage waveform applied to the lamp is labelled Vb, this point showing the minimum of the absolute value in a closed gap between the above described point (K) and the above described point (U5), the point (K) corresponding to the time of starting of the discharge of the voltage waveform applied to the lamp and the point (U5) showing the maximum of the absolute value of the voltage applied to the lamp;

the absolute value of the difference Vk−Vf being labelled Vx; and the absolute value of the difference Vh−Vb being labelled Vy.

The following effects can be obtained by this measure:

Since using a feed device with a feasibly small output impedance on the entire wall surface of the dielectric barrier discharge lamp a discharge can be uniformly formed, the voltage applied to the lamp can be made higher than the minimum energy which produces a discharge, Furthermore it is possible to reach a degree in which the drop of the efficiency of the excimer emission as a result of the increase of the voltage applied to the lamp can be allowed.

COMMERCIAL APPLICATION

The light source device as claimed in the invention with a dielectric barrier discharge lamp can be used for a UV light source for a photochemical reaction and the like.

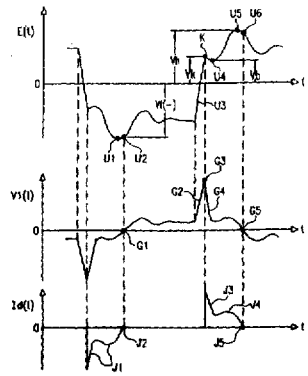

What we claim is:

1. Light source device with a dielectric barrier discharge lamp which has a dielectric barrier discharge lamp (1) and a feed device (7) for application of a high voltage to electrodes (3, 4) of the dielectric barrier discharge lamp (1), the dielectric barrier discharge lamp (1) having a discharge plasma space (2) filled with a discharge gas which produces excimer molecules by a dielectric barrier discharge, and there being dielectrics (5, 6) in the dielectric barrier discharge lamp (1) between at least one of the electrodes (3, 4) for inducing the discharge phenomenon in the discharge gas; wherein the above described feed device (7) applies a high voltage with an essentially periodic waveform via a set-up transformer (8) to the dielectric barrier discharge lamp (1), and that a condition $Vy/Vx \leq 1.0$ (formula 1) is satisfied, when a point K is considered which corresponds to the time of starting of the discharge of the voltage waveform applied to the lamp and where:

Vk is the voltage at the point K which corresponds to the time of starting of the discharge of the voltage waveform applied to the lamp;

Vf is the voltage applied to the lamp upon completion of the discharge just before a discharge to which the point K belongs, the point K corresponding to the time of starting of the discharge of the voltage waveform applied to the lamp;

Vh is the voltage applied to the lamp at a point U5, this point showing the maximum of the absolute value of the voltage applied to the lamp in the time interval from the time of transition of the point K to the next change of polarity of the voltage applied to the lamp, and the point K corresponding to the time of starting of the discharge of the voltage waveform applied to the lamp;

Vb is the voltage applied to the lamp at a point U4 of the voltage waveform applied to the lamp, this point showing the minimum of the absolute value in a closed gap between the point K and the point U5, the point K corresponding to the time of starting of the discharge of the voltage waveform applied to the lamp and the point U5 showing the maximum of the absolute value of the voltage applied to the lamp;

Vx is the absolute value of the difference Vk−Vf; and

Vy is the absolute value of the difference Vh−Vb.

2. Light source device with a dielectric barrier discharge lamp as claimed in claim 1, wherein the voltage Vk at a flex point which occurs for the voltage waveform applied to the lamp when the voltage rises or drops is used for the voltage Vk at the point K which corresponds to the time of starting of the discharge of the voltage waveform applied to the lamp.

3. Light source device with a dielectric barrier discharge lamp as claimed in claim 1, wherein a fluorescent body is applied at least partially to surfaces of the dielectrics (5, 6) which are on a side of the discharge plasma space (2).

* * * * *

UNITED STATES PATENT AND TRADEMARK OFFICE
CERTIFICATE OF CORRECTION

PATENT NO. : 6,239,559 B1  
DATED : May 29, 2001  
INVENTOR(S) : Masashi Okamoto et al.

Page 1 of 2

It is certified that error appears in the above-identified patent and that said Letters Patent is hereby corrected as shown below:

Title page,  
The title page showing the illustrative figure should be deleted and substitute therefor the attached title page.

Drawings,  
Figure 3 should be deleted and substitute therefor the corrected Figure 3, as shown.

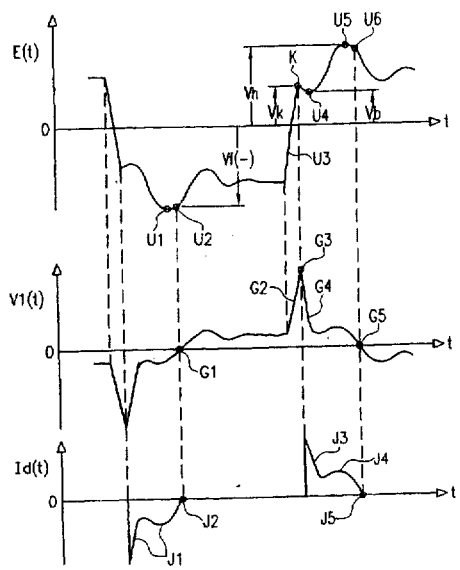

FIG. 3

Signed and Sealed this

Twenty-eighth Day of May, 2002

Attest:

*Attesting Officer*

JAMES E. ROGAN  
*Director of the United States Patent and Trademark Office*

United States Patent
Okamoto et al.

(10) Patent No.: US 6,239,559 B1
(45) Date of Patent: May 29, 2001

(54) LIGHT SOURCE USING DIELECTRIC BARRIER DISCHARGE LAMP

(75) Inventors: Masashi Okamoto, Akashi; Kenichi Hirose, Himeji, both of (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/355,348
(22) PCT Filed: Jan. 11, 1999
(86) PCT No.: PCT/JP99/00047
§ 371 Date: Aug. 6, 1999
§ 102(e) Date: Aug. 6, 1999
(87) PCT Pub. No.: WO99/35891
PCT Pub. Date: Jul. 15, 1999

(30) Foreign Application Priority Data

Jan. 9, 1998 (JP) .................................. 10-013540

(51) Int. Cl.[7] .................................................. G05F 1/00
(52) U.S. Cl. ...................... 315/307; 315/57; 315/111.21; 315/219; 315/276
(58) Field of Search .......................... 315/56, 57, 70, 315/111.01, 111.21, 209 R, 219, 276, 291, 307

(56) References Cited

U.S. PATENT DOCUMENTS 4,253,047 * 2/1981 Walker et al. ......................... 315/57

(List continued on next page.)

FOREIGN PATENT DOCUMENTS 1-243363 9/1989 (JP) .

(List continued on next page.)

OTHER PUBLICATIONS

Discharge Handbook, Elektroassociation, Jun.1989, 7th Edition, pp. 263–271.

Primary Examiner—Don Wong
Assistant Examiner—Thuy Vinh Tran
(74) Attorney, Agent, or Firm—Nixon Peabody LLP; David S. Safran

(57) ABSTRACT

A feed device (7), via a set-up transformer (8), applies a high voltage with an essentially periodic waveform to a dielectric barrier discharge lamp (1), and the condition $Vy/Vx \leq 1.0$ is satisfied when a point K is considered which corresponds to the instant of starting of the discharge of the voltage waveform applied to the lamp, and where $Vk$ is the voltage at the point K which corresponds to the time of starting of the discharge of the voltage waveform applied to the lamp;

$Vf$ is the voltage applied to the lamp upon completion of the discharge just before a discharge to which the point K belongs, the point K corresponding to the time of starting of the discharge of the voltage waveform applied to the lamp;

$Vh$ is the voltage applied to the lamp at a point U5, this point showing the maximum of the absolute value of the voltage applied to the lamp in the time interval from the time of transition of the point K to the next change of polarity of the voltage applied to the lamp, and the point K corresponding to the time of starting of the discharge of the voltage waveform applied to the lamp;

$Vb$ is the voltage applied to the lamp at a point U4 of the voltage waveform applied to the lamp, this point showing the minimum of the absolute value in a closed gap between the point K and the point U5 the point K corresponding to the time of starting of the discharge of the voltage waveform applied to the lamp and the point U5 showing the maximum of the absolute value of the voltage applied to the lamp;

$Vx$ is the absolute value of the difference $Vk-Vf$; and $Vy$ is the absolute value of the difference $Vh-Vb$.

3 Claims, 10 Drawing Sheets